(12) United States Patent
Baumstein et al.

(10) Patent No.: US 8,352,190 B2
(45) Date of Patent: Jan. 8, 2013

(54) METHOD FOR ANALYZING MULTIPLE GEOPHYSICAL DATA SETS

(75) Inventors: Anatoly Baumstein, Houston, TX (US); Ramesh Neelamani, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 475 days.

(21) Appl. No.: 12/684,607

(22) Filed: Jan. 8, 2010

(65) Prior Publication Data

US 2010/0212909 A1 Aug. 26, 2010

Related U.S. Application Data

(60) Provisional application No. 61/154,152, filed on Feb. 20, 2009.

(51) Int. Cl.
*G01V 3/12* (2006.01)
(52) U.S. Cl. .................. 702/5; 702/14; 702/17; 702/18; 367/14; 367/24; 367/110; 367/46; 367/70; 367/71; 166/369
(58) Field of Classification Search .................. 702/1, 2, 702/11, 5, 13, 14, 16, 17, 18, 24; 367/18, 367/14, 24, 15, 16, 38, 21, 73, 110, 63, 70, 367/71, 52, 51, 46, 145; 703/5; 166/369, 166/250.01
See application file for complete search history.

(56) References Cited

U.S. PATENT DOCUMENTS

| | | | |
|---|---|---|---|
| 5,253,193 A | 10/1993 | Walker | 364/748 |
| 5,617,372 A | 4/1997 | Gulunay et al. | 367/38 |
| 5,781,503 A * | 7/1998 | Kim | 367/45 |
| 5,873,049 A * | 2/1999 | Bielak et al. | 702/6 |
| 6,295,505 B1 * | 9/2001 | Assa et al. | 702/17 |
| 6,307,569 B1 | 10/2001 | Ratakonda | 345/671 |
| 6,819,628 B2 * | 11/2004 | Tal-Ezer | 367/51 |
| 7,191,063 B2 * | 3/2007 | Tompkins | 702/2 |
| 7,202,663 B2 | 4/2007 | Huang | 324/307 |
| 7,356,412 B2 * | 4/2008 | Tompkins | 702/2 |
| 7,477,792 B2 | 1/2009 | Deffenbaugh et al. | |
| 7,507,362 B2 | 3/2009 | Anderson et al. | |

(Continued)

FOREIGN PATENT DOCUMENTS

WO WO2007/095312 8/2007

OTHER PUBLICATIONS

Abma, R. et al. (2003) Comparisons of interpolation methods in the presence of aliased events *Expanded Abstracts*, SEG, 4 pgs.

(Continued)

*Primary Examiner* — Carol Tsai
(74) *Attorney, Agent, or Firm* — ExxonMobil Upstream Research Company Law Dept.

(57) ABSTRACT

An exemplary embodiment of the present invention provides a method for interpolating seismic data. The method includes collecting seismic data of two or more types over a field (401), determining an approximation to one of the types of the seismic data (402), and performing a wave-field transformation on the approximation to form a transformed approximation (405), wherein the transformed approximation corresponds to another of the collected types of seismic data. The method may also include setting the transformed approximation to match the measured seismic data of the corresponding types at matching locations (408), performing a wave-field transformation on the transformed approximation to form an output approximation (412), and using the output approximation to obtain a data representation of a geological layer (416).

19 Claims, 6 Drawing Sheets

U.S. PATENT DOCUMENTS

| | | | |
|---|---|---|---|
| 7,542,851 B2 * | 6/2009 | Tompkins | 702/2 |
| 7,627,433 B2 | 12/2009 | Duren et al. | |
| 7,987,054 B2 | 7/2011 | Baumstein | |
| 8,073,625 B2 | 12/2011 | Deffenbaugh et al. | |
| 8,082,106 B2 * | 12/2011 | Matson et al. | 702/14 |
| 2004/0196738 A1 * | 10/2004 | Tal-Ezer | 367/51 |
| 2005/0251340 A1 * | 11/2005 | Tompkins | 702/2 |
| 2007/0025182 A1 | 2/2007 | Robertsson | 367/18 |
| 2007/0127315 A1 * | 6/2007 | Tompkins | 367/75 |
| 2008/0068020 A1 * | 3/2008 | Tompkins | 324/335 |
| 2009/0048784 A1 * | 2/2009 | Matson et al. | 702/14 |
| 2011/0004409 A1 | 1/2011 | Diallo et al. | |
| 2011/0134721 A1 | 6/2011 | Deffenbaugh et al. | |
| 2011/0147004 A1 | 6/2011 | Neelamani et al. | |

OTHER PUBLICATIONS

Abma, R. et al. (2006) "3D Interpolation of Irregular Data with a POCS Algorithm" *Geophysics*, 71 No. 6, pp. E91-E97.

Baumstein, A. et al. (2003) "Wavefield Extrapolation in Laterally Varying VTI Media", *Expanded Abstracts, SEG Annual Meeting*, 4pgs.

Biondi, B. et al. (1998) "Azimuth Moveout for 3-D Prestack Imaging," *Geophysics* 63, pp. 574-588.

Ferguson, R. (2006), "Regularization and Datuming of Seismic Data by Weighted, Damped Least Squares", *Geophysics* 71(5) pp. U67-U76.

Herrmann, F. J. et al. (2008) "Non-Parametric Seismic Data Recovery With Curvelet Frames", *Geophysical Journal International*, 173: pp. 233-248.

Zwartjes, P. M. et al. (2007) "Fourier Reconstruction of Nonuniformly Sampled, Aliased Seismic Data", *Geophysics*, 72, No. 1, pp. v21v32.

Research Disclosure (2006) "Redatuming of Marine Controlled-Source Electromagnetic Data," *Mason Publications*, Hampshire, GB, 512, No. 4, 12 pgs.

* cited by examiner

METHOD FOR ANALYZING MULTIPLE GEOPHYSICAL DATA SETS

CROSS-REFERENCE TO RELATED APPLICATIONS

This application claims the benefit of U.S. Provisional application 61/154,152 which was filed on Feb. 20, 2009.

FIELD OF THE INVENTION

Exemplary embodiments of the present invention relate to a method for enhancing geophysical data for analysis of hydrocarbons.

BACKGROUND OF THE INVENTION

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

In the oil and gas industry, seismic prospecting techniques commonly are used to aid in the search for and evaluation of subterranean hydrocarbon deposits. A seismic prospecting operation consists of three separate stages: data acquisition, data processing, and data analysis and interpretation, and success of the operation depend on satisfactory completion of all three stages.

In the data acquisition stage, various methods may be used to obtain many responses from the subsurface regions. For instance, a source is used to generate an elastic signal, or wave, that propagates into the subsurface structure of the earth. The elastic wave is at least partially reflected from a boundary between one or more laminated layers, generally due to contrasts in seismic impedance between the layers. More specifically, adjacent layers in the subsurface have different lithology and physical properties and, thus, may present different densities and velocities to the elastic wave. The product of density and velocity of seismic energy transmission through each layer is called seismic impedance. The impedance contrast at the boundaries between adjacent layers causes the reflections that may then be recorded by a receiver as a seismic trace. The recorded seismic trace can be modeled as a convolution of the earth's impulse response with the seismic signal produced by the source.

During seismic survey of a subterranean region, seismic data is acquired by typically positioning the seismic source at a chosen shot location, and measuring the seismic reflections generated by the source using receivers placed at selected locations. The measured reflections are referred to as a single "shot record." Several shot records are measured during a survey by moving the source and receivers to different location and repeating the aforementioned process. Ideally, the source and receiver locations lie on a uniformly and densely sampled grid, but this is difficult to achieve in practice for many reasons including surface obstructions, ocean currents, cable feathering, and acquisition cost. For example, the economics of seismic data acquisition may influence the spacing between receivers, e.g., lowering costs by setting the spacing as large as possible while still yielding the adequate detail in the survey results.

During the data processing stage, the recorded geophysical data (for example, seismic signals) are refined and enhanced using a variety of procedures that depend on the nature of the geologic structure being investigated and on the characteristics of the raw geophysical data. In general, the purpose of the data processing stage is to produce a data representation, such as an image, of the subsurface from the recorded data for use during the data interpretation stage. The data representation may be used to determine the general geologic structure of a subsurface region, to locate potential hydrocarbon reservoirs, and/or to guide the development of an already discovered reservoir.

The accuracy of the image obtained by the analyzing the signals may be limited by the amount of geophysical data obtained for a specific site. More specifically, the seismic data, for example, may be incomplete, providing an incomplete image to the reservoir. Although other seismic data may have been collected using different techniques or locations, combining seismic data of different types may be problematic.

Other related material may be found in the following publications: Abma, R. and Kabir, N., "3D Interpolation of Irregular Data with a POCS Algorithm" Geophysics, 71 No. 6, pp. E91-E97, (November-December 2006); Baumstein and Anderson, "Wavefield Extrapolation in Laterally Varying VTI Media", Expanded Abstracts, SEG Annual Meeting (2003); Bauschke, H. H. and Borwein, J. M., 1996, "On Projection Algorithms for Solving Convex Feasibility Problems", SIAM Review, 38, No. 3, pp. 367-426; Biondi, Fomel and Chemingui, "Azimuth Moveout for 3-D Prestack Imaging," Geophysics 63, pp. 574-588 (1998); Ferguson, R, (2006), "Regularization and Datuming of Seismic Data by Weighted, Damped Least Squares", Geophysics 71(5) pp. U67-76; Gulunay, N., "Seismic Trace Interpolation in Fourier Transform Domain", Geophysics", 68, No. 1 (January-February 2003), pp. 355-369; Herrmann, F. J. and Hennenfent, G., "Non-Parametric Seismic Data Recovery With Curvelet Frames", Geophysical Journal International, 173: pp. 233-248, April 2008; Simard P. Y and Mailloux, G. E. (1990), "Vector Field Restoration by the Method of Convex Projections", Computer Vision, Graphics, and Image Processing, 52, No. 3, pp. 360-285; and Zwartjes, P. M. and Sacchi, M. D., "Fourier Reconstruction of Nonuniformly Sampled, Aliased Seismic Data", Geophysics, 72, No. 1 (January-February 2007). Other related material may be found in the following U.S. Pat. Nos. 5,253,193; 5,617,372; 6,307,569; and 7,202, 663; and Intl. Patent App. Pub. No. WO2007/095312.

SUMMARY OF THE INVENTION

An exemplary embodiment of the present invention provides a method for enhancing geophysical data. The method includes obtaining geophysical data of two or more types for a subsurface region, the two or more types including at least a first type of geophysical data and a second type of geophysical data. An approximation to the obtained geophysical data is determined for the first type of geophysical data. A wave-field transformation is performed on the approximation to form a transformed approximation, wherein the transformed approximation corresponds to the obtained geophysical data for the second type of geophysical data. The transformed approximation is adjusted to substantially match the obtained geophysical data for the second type at corresponding locations, and the adjusted approximation is used to enhance a geophysical data representation of the subsurface region.

In embodiments, the method may also include enforcing statistical constraints on the approximation prior to performing the wave-field transformation on the approximation. Determining the approximation may include processing the geophysical data to estimate initial values for missing geophysical data. Enforcing statistical constraints on the approximation may include transforming the approximation into a transform domain from a native domain, adjusting the approximation in the transform domain to satisfy known statistical properties, and performing an inverse transformation to convert the adjusted approximation back to the native domain from the transform domain. Transforming may include applying a Fourier transform, a curvelet transform, a Radon transform, or any combinations thereof. Adjusting the transformed approximation may include the application of a projection operator to the transformed approximation. The projection operator may include a hard threshold function or a soft threshold function.

In embodiments, performing a wave-field transformation on the approximation may include transforming the approximation into a transform domain, imposing a function on the approximation in the transform domain, and performing an inverse transformation on the approximation to form the transformed approximation. Transforming may include applying a Fourier transform function, a curvelet transform, or a Radon transform. The function may be a one-way wave equation-based extrapolator. Similarly, performing a wave-field transformation on the transformed approximation may include transforming the transformed approximation into a transform domain, imposing a function on the transformed approximation in the transform domain, and performing an inverse transformation on the transformed approximation to form the output approximation. Transforming may also include applying a Fourier transform function, a curvelet transform, or a Radon transform, or any combinations thereof. The function may be a one-way wave equation-based extrapolator.

In embodiments, the output approximation may correspond to the first type of geophysical data. The types of geophysical data obtained may include ocean surface seismic data, ocean bottom seismic data, land based seismic data, controlled source electromagnetic (CSEM) data, or any combinations thereof. The data representation may be an image of the geological layers in the subsurface region, a two dimensional matrix of properties of the geological layers in the subsurface region, or a three dimensional matrix of properties of the geological layers in the subsurface region, or any combinations thereof.

Another exemplary embodiment provides a method for producing hydrocarbons from a field. The method may include obtaining geophysical data of two or more types over a subsurface region, determining an approximation to the collected geophysical data of a first type, performing a wave-field transformation on the approximation to form a transformed approximation to the geophysical data of a second type, and setting the transformed approximation to match the collected geophysical data for the second type at corresponding locations. A wave-field transformation may be performed on the transformed approximation to form an output approximation, and the output approximation may be used to obtain a data representation of a subsurface region. The data approximation may be used to predict a subsurface region for hydrocarbons based at least in part on the data representation of the geological layer, and hydrocarbons may be extracted from the subsurface location.

Another embodiment provides a tangible, machine-readable medium that includes code adapted to store two or more types of geophysical data collected over a subsurface region, code adapted to an approximation to the collected geophysical data for a first type of the geophysical data, and code adapted to perform a wave-field transformation on the approximation to form a transformed approximation, wherein the transformed approximation corresponds to the collected geophysical data for a second type of geophysical data. The tangible, machine-readable medium may also include code adapted to perform a wave-field transformation on the transformed approximation to form an output approximation, and code adapted to use the output approximation to obtain a data representation of a geological layer.

In other embodiments, the tangible, machine-readable medium may include code adapted to enforce statistical assumptions on the approximation. The tangible, machine-readable medium may also include code adapted to enforce statistical assumptions on the transformed approximation. The code adapted to obtain the data representation of the subsurface region may include code configured to form an image of the subsurface region on an imaging device.

DESCRIPTION OF THE DRAWINGS

The advantages of the present invention will be better understood by referring to the following detailed description and the attached drawings, in which.

Figure 1:
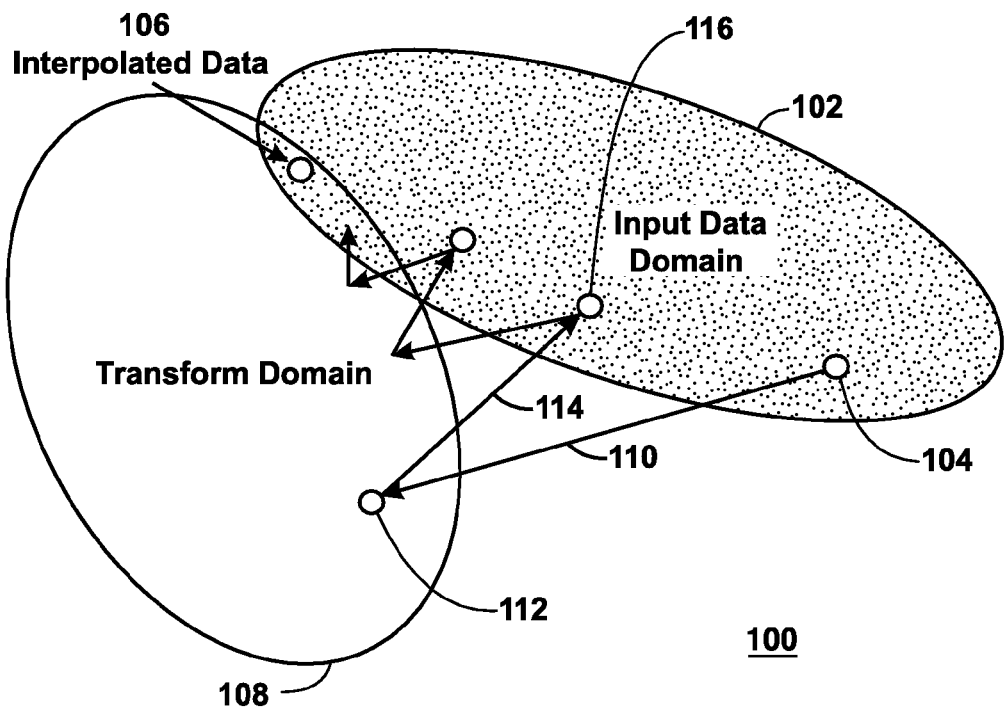
FIG. 1 illustrates an overview of the POCS-type technique for using a transform to iteratively interpolate missing seismic data.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION OF THE INVENTION

In the following detailed description section, the specific embodiments of the present invention are described in connection with preferred embodiments. However, to the extent that the following description is specific to a particular embodiment or a particular use of the present invention, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent.

As used herein, "3D Surface-related Multiple Elimination (SRME)" is a technique for identification and suppression of multiple reflections in geological layers. The interference of multiple reflections with primary reflections results in a distorted representation of the subsurface and introduces interpretation uncertainties.

As used herein, "aliasing," is insufficient sampling of data along an axis (e.g., less than two points per wavelength) that may cause the data to be incorrectly mapped to lower frequencies, resulting in distortion of the waveforms. As an example, aliasing may result in distortion where the wheels of a moving car are shown in a motion picture. Depending on the frame rate for the data collection, the frame collected may not be synchronized with the rotational rate of the wheels, causing an effect in which wheel rotation is inconsistent with the car's motion. More frames per second may reduce this problem, although interpolation between existing frames is a possible way to achieve the same result.

As used herein, "attribute" means the result of a specific mathematical operation performed on a portion of the data. For example, seismic data may be processed so that positive amplitudes correspond to strata which have higher impedances than underlying or overlying strata, while negative amplitudes correspond to lower impedance strata. For this example, an event duration attribute may be defined to be the time interval on each trace during which the event's amplitude does not change sign; this attribute is useful because it relates to the thickness of the geologic stratum, although it also depends on the velocity of sound in the stratum and on the bandwidth of the seismic data. Generally attributes are influenced by seismic processing, but their usefulness comes from their dependence on specific properties of the subsurface material.

As used herein "auxiliary data" is a secondary data type, as defined below, which may be used to enhance the accuracy of the interpolation of missing data. The auxiliary data may be any type of geophysical data that may be used for characterizing subsurface layers under the surface of the earth, including, for example seismic data such as ocean surface seismic data, ocean bottom seismic data, land based seismic data, or any combinations thereof. Other types of geophysical data, such as electromagnetic data sets including controlled source electromagnetic (CSEM) data, and magnetotelluric data, among others, may be used as the auxiliary data type. Further, any of these data types may be used as the primary or initial data for the analysis. The auxiliary data generally exists in an auxiliary or secondary domain, as opposed to the primary data type which exists in a primary or native domain.

As used herein "azimuth" is a measurement system used to describe the orientation of a source-receiver line, generally relative to the nominal acquisition direction.

As used herein, "computer readable media" is any source of organized information that may be processed by a computer to perform the steps developed in this invention, including but not limited to: a magnetically readable storage system; optically readable storage media such as punch cards or printed matter readable by direct methods or methods of optical character recognition; other optical storage media such as a compact disc (CD), a digital versatile disc (DVD), a rewritable CD and/or DVD; electrically readable media such as programmable read only memories (PROMs), electrically erasable programmable read only memories (EEPROMs), field programmable gate arrays (FPGAs), and flash random access memory (flash RAM).

As used herein, "convergence" occurs during an iterative data modeling procedure when the output data, or a function measuring error, remains substantially the same between iterations. Convergence may be used to determine an end point for the iterative process.

As used herein, "data" refers to any information that may result from an analysis of a geological region which may include a multidimensional matrix containing information obtained about points in the subsurface structure of a field using geophysical methods. At least three dimensions in the geophysical data may represent the location of each point in space-time, for example, x, y, and t, where x and y represent to the location of the point in an x, y grid on the surface, and t represents the time for a reflected elastic wave to reach the surface. Depending on the properties of the geological layers, t may generally represent the depth of the point below the surface of the earth. The multidimensional matrix may contain at least one other dimension representing the signal value at each location. For example, this dimension may represent any seismic data that may be connected to a particular point in the field, including such seismic data as offset gathers, offset stacks, angle gathers, angle stacks, $I_p$, $I_s$, $V_p$, $V_s$, $\rho$, $\mu$, and various AVA parameters, among others. Seismic data, as generally collected, may have seven dimensions: (x,y,z) for each of the sources and receivers and time. If both the source and the receivers are on the surface (z=0), then the seismic data is five dimensional.

As used herein, a "data set" is any group of data that may result from the collection and/or analysis of geophysical data. Data sets that may be used herein include offset gathers, offset stacks, angle gathers, angle stacks, AVA parameters, AVO parameters, or any combinations thereof.

As used herein, the term "data type" is used to describe geophysical data that was acquired with a particular source-receiver configuration. For example, vertical seismic profiles, ocean bottom cable, ocean bottom system (OBS), single- or multi-component data, streamer marine data acquired by towing streamers or sources at varying depths, or land based seismic data each constitute a different type of seismic data.

As used herein, "dip" refers to the orientation of a plane that is tangent to the surface of a rock layer at a given map location. Specifically, there are two angles defining the orientation of a vector that points in a direction that maximizes the vectors dip and magnitude and lie on the tangent plane. The dip angle is referenced to the horizon, which is a horizontal plane oriented so that its normal points toward the center of the earth at the location of interest. Dip is the angle the vector makes relative to the horizon. When the vector is projected onto the horizon plane, strike is the angle from the projected vector to a unit vector pointing north.

As used herein, "Dip Move-Out" (DMO) is a partial migration technique for processing seismic data that maps (using a straight-ray propagation approximation) data acquired with non-zero offset (source-receiver distance) into data that would have been acquired over the same area with coincident (zero offset) sources and receivers. DMO serves as the basis for a technique known as "azimuth move-out" (AMO).

As used herein, "geological layers" refers to layers of the Earth's subsurface that are disposed between geologic formation tops, each of which produce seismic reflections subsequently mapped by interpreters as seismic horizons.

As used herein, "horizons" are mechanically marked surfaces deemed important by an interpreter. Marking these surfaces is done by interpreters when they draw lines on a seismic section. Each line represents the presence of an interpreted surface at that location. An interpretation project typically generates several dozen and sometimes hundreds of horizons.

As used herein, "impedance" is the product of seismic velocity and the density. Impedance, also called acoustic impedance, typically varies among different rock layers, e.g., opposing sides of an interface may have different impedances. The reflection coefficient of an interface generally depends on the contrast in acoustic impedance of the rock on either side of the interface. Specifically, the difference in acoustic impedance between rock layers affects the reflection coefficient. Two types of impedance terms are generally defined, $I_p$ and $I_s$ wherein $I_p$ is impedance to longitudinal pressure waves, and $I_s$ is impedance to lateral shear waves. One geophysical modeling process for determining the impedance structure of a subsurface region based on recorded seismic reflection data is seismic inversion.

As used herein, "interface" is an edge of a geologic model and/or a boundary of a volumetric region of the geologic model. Interfaces may separate regions having contrasting flow properties, and/or behave as a barrier or conduit to flow. Interfaces can separate regions that include but are not limited to stratigraphic regions, such as sequences or parasequences, facies regions, such as shale layers or individual channels, petrophysical and/or diagenetic regions, such as cemented, porous or fractured regions, and structural regions, such as fault blocks.

As used herein, "inversion" or "geophysical inversion" attempts to find a model of subsurface properties that optimally explains observed seismic data and satisfies geological and geophysical constraints. There are a large number of well known methods of geophysical inversion. These well known methods fall into one of two categories, iterative inversion and non-iterative inversion. Non-iterative inversion is generally an inversion that is accomplished by assuming some simple background model and updating the model based on the input seismic data. This method does not use the updated model as input to another step of inversion. For the case of seismic data these methods are commonly referred to as imaging, migration, diffraction tomography or Born inversion.

As used herein, "iterative inversion" involves repetitious improvement of the subsurface properties model such that a model is found that satisfactorily explains the observed seismic data. If the inversion converges, or ceases to change between each iteration, then the final model may more closely approximate the actual subsurface properties. Iterative inversion usually produces a more accurate model than non-iterative inversion, but is much more expensive to compute.

Two iterative inversion methods commonly employed in geophysics are cost function optimization and series methods. Cost function optimization involves iterative minimization or maximization of the value, with respect to the model M, of a cost function S(A) which is a measure of the misfit between the calculated and observed data. The cost function is also sometimes referred to as the objective function. Generally, the calculated data is simulated with a computer using the current geophysical properties model and the physics governing propagation of the source signal in a medium represented by a given geophysical properties model. The simulation computations may be done by any of several numerical methods including but not limited to finite difference, finite element or ray tracing.

Series methods involve inversion by iterative series solution of the scattering equation. The solution is written in series form, where each term in the series corresponds to higher orders of scattering. Iterations in this case correspond to adding a higher order term in the series to the solution.

As used herein, "L-1 norm" is a measure of fit between two data sets. Generally, an L-1 norm is a summation of the absolute values of differences between data points. By comparison, an "L-2 norm" is a measure of the distance between two objects and is generally calculated as the square root of the sum of the squares of the differences.

As used herein, a "one-way wave equation" is an evolution equation in one of the space directions that approximately describes the downward or upward propagation of a wave field, but not both simultaneously. Similar equations exist to relate various types of electromagnetic data, as known by those skilled in the art.

As used herein, "receivers" are devices, usually placed in an array or grid-like pattern on the surface of the earth or just beneath, used to detect reflections of vibrations from rock strata. Measurement of the intensity and time delay of an arriving reflected wave at numerous locations allows the mapping of rock strata, and gives information about the thickness and composition of the layers.

As used herein, "redatuming" is a process by which seismic data measured at one location are reconstructed at a desired datum (depth level) from seismic data that was acquired at a different datum (usually surface of the earth, sea floor or just under the sea surface). Redatuming is generally performed by converting the seismic data as collected (e.g., the shot data) into the frequency domain using a Fourier transform, then applying a frequency shifting wave equation to compensate for the depth differences between the actual point of collection and the migrated point. An inverse transform is then performed, resulting in seismic data that appears to have been collected at the new location. In a final step, an imaging condition is applied to the redatumed seismic data for the source and receiver to create a migrated image of the subsurface layers at the new location. Another technique that may be used for redatuming is interferometry, in which the data is cross-correlated with itself to allow reconstruction of the appearance of the data if the receivers or sources were moved.

As used herein, "reflection coefficient" means the ratio of the amplitude of the reflected wave to that of the incident wave. Generally, a low impedance layer over a high impedance layer produces a positive reflection, and a high impedance layer over a low impedance layer produces a negative reflection.

As used herein, "seismic reflection surveys" are the most common type of "seismic survey" and are performed by initiating a seismic source at the earth's surface and monitoring at a plurality of surface locations the reflections of this disturbance from the underlying subterranean formations in the subsurface structure. These reflections occur from regions where there is a change in the acoustic impedance of the earth, generally the interface between adjacent strata. The devices used to monitor the reflections are termed receivers, e.g., geophones. The signal recorded by each receiver represents a function of time the amplitude of the reflections detected by that geophone. As a rough approximation, the reflections detected by each receiver occur from a point on each reflective surface located on a vertical line passing through the midpoint between the source and geophone. Thus, for every seismic disturbance ("shot"), each receiver (e.g., geophone) records a signal ("trace") which represents features of the formations vertically beneath a known point on the surface of the earth.

As used herein, a "seismic streamer" is a long cable containing a number of evenly spaced seismic receivers that is towed behind a seismic ship for performing seismic data collection on geophysical layers located below the bottom of the ocean. The cable may be six to fifteen kilometers in length. The ship traverses the field, often towing eight to twelve streamers simultaneously along parallel courses while collecting the seismic data. The receivers along the cable are considered to be along the "in-line" direction (e.g., x in the seismic data). Seismic data collected from parallel traverses of the field are considered to be in the "cross-line" direction (e.g., y in the seismic data).

As used herein, "Shot-Record Wave Equation Migration (SRWEM)" is a wave-equation-based process that removes distortions from reflection records by moving events to their correct spatial locations, and by collapsing energy from diffractions back to their scattering points." Shot record wave equation migration derives its name from performing migration in the shot record domain using a wave equation, which is generally one-way, e.g., factorized from a two-wave equation to form an equation that relates to a single direction of travel. More rarely, a two-way wave equation may be used for migration. Migration generally involves two redatuming processes, e.g., both the source and the receivers are redatumed to appear as if they were initially located at a different point in space, for example, data collected at the ocean surface may be redatumed to appear as if collected at the ocean bottom.

As used herein, "sparsity" is a statistical assumption wherein a large number of values in a data matrix are assumed to be zero. Thus, a smaller number of observations may be made to predict values in a sparse matrix. Accordingly, sparsity may be enforced on a data set by transforming the data from a native domain, such as the time domain, into another domain, such as a frequency domain, then imposing a "shrinkage function" on the data to force a number of coefficients to zero. The shrinkage function may be described as "hard thresholding" or as "soft thresholding." Using hard thresholding, all but a few (e.g., the largest) coefficients are set to zero. In contrast, using soft thresholding the magnitudes of all coefficients are reduced by a designated value, wherein any resulting coefficients with negative magnitudes are set to zero. After shrinkage, the data may then be transformed back into a native domain, such as the time domain. The resulting data matrix may have less noise than the initial data matrix and, thus, may be easier to model with a limited number of data points (observations).

As used herein, the "subsurface structure" is the structure of the geological layers below the surface of the earth. The general goal of seismic reflection surveys is to build a data representation of the subsurface structure of sufficient quality to accurately predict a location for hydrocarbons, such as gas and oil.

As used herein, a "tensor" is a multi-dimensional data structure, such as a vector. A tensor may be used to map data from an initial data space to a final data space, such as a scaling function.

As used herein, a "transform" is a mathematical function that converts data from one domain to another. For example, a Fourier transform may be used to convert data from a time or spatial domain to a frequency or wavenumber domain. In the time domain, the signal intensity is charted against time. In comparison, in the frequency domain, the signal intensity is charted against the frequency of the response. In this domain, high levels that correspond to actual signals in the data may be distinguished, and filtered out, more easily than in the time domain. In addition to the Fourier transform, transform functions that may be used in embodiments of the present techniques include the "Radon transform" and the "curvelet transform," among others. Generally, the linear Radon transform converts a signal from signal intensity at an x and y location to signal intensity as a function of angle. Accordingly, this transform may be useful in identifying straight lines present in a noisy signal. The curvelet transform represents edges and other singularities in space, and may be useful for identifying these features in a noisy signal.

As used herein, the phrase "physics-based algorithm" refers to a mathematical algorithm based on first principles that govern propagation of a source signal in a geological region of interest. A calculation is said to be from first principles, if it starts directly at the level of established laws of physics and does not make assumptions such as model and fitting parameters and does not rely solely on Fourier transforms, curvelet transforms, or Radon transforms or similar transforms that are mathematical transforms without a physical basis. Fourier transforms, curvelet transforms and Radon transforms are not physics based. A "wave-field transformation", as discussed in more detail below, uses one or more physics-based algorithms.

The accuracy of seismic analysis may be affected by data that is missing from the seismic survey. Missing seismic data may be caused by any number of events. For example, a seismic ship towing a seismic streamer may be unable to operate close to oil platforms, shallows, reefs, or other obstructions. Given that typical shot intervals, or spacing, in marine acquisition are already hundreds of meters in the crossline direction, the seismic data obtained may be missing points that would be useful for accurately imaging the subsurface structure. Accordingly, there is a need to perform interpolation in order to make seismic data suitable for many modern data processing techniques, such as 3D Surface-related Multiple Elimination (SRME) and Shot-Record Wave Equation Migration (SRWEM). For example, 3D SRME requires a data spacing of roughly 10-20 meters. Similarly, in the case of SRWEM, 360-degree receiver coverage and fine (10 m) trace spacing would be ideal. A number of interpolation techniques exist that attempt to interpolate the missing seismic data and also to place irregularly sampled seismic data on a fixed grid. However, aliasing may cause distortions in the seismic data when using these techniques. Exemplary embodiments of the present invention provide techniques for interpolating seismic data and overcoming severe aliasing distortions by incorporating statistical and physical assumptions about the seismic data and seismic data of other types into an enhanced iterative method for interpolation.

Existing seismic data interpolation methods may allow for the interpolation of data without aliasing distortion under certain assumptions. Generally, these existing data interpolation techniques rely on schemes using one of two types of assumptions. In a first scheme the statistical properties of the seismic data are assumed. A widely used assumption is that the representation of the seismic data may be sparse in some domain, e.g., that the majority of the seismic data should be zero. Thus, after applying a multi-dimensional Fourier transform to transform the seismic data into the frequency (f–k) domain, a relatively small percentage of the coefficients may be assumed to be non-zero. With this assumption, one may select several of the largest coefficients in the Fourier domain and perform an inverse Fourier transformation to a finely and regularly sampled grid, thereby overcoming the aliasing problem. This technique is similar to a technique termed "projection onto convex sets" or POCS. However, POCS does not necessarily use a hard thresholding operator or a Fourier transform. Thus, interpolation using this technique is termed a POCS-type interpolation.

A POCS-type interpolation of seismic data, such as a shot record, using a Fourier transform method may follow a number of steps. The method begins with transforming the shot record into the (f–k) domain. Thereafter, all but a certain number of Fourier coefficients may be set to zero (i.e., hard thresholding). Alternatively, the magnitudes of all coefficients in the frequency domain may be reduced by a selected factor, with any resulting coefficients with negative magnitudes set to zero (i.e., soft thresholding). Other assumptions may be imposed in the frequency domain in place of, or in addition to, thresholding. For example, the coefficients for the non-interpolated areas may be examined in the frequency domain to determine which coefficients should generally be non-zero. These coefficients may then be kept across the interpolated section. Further, physical constraints (i.e., based on the known physics of the geological layers for the field) may be used to limit certain coefficients in the frequency domain.

An inverse Fourier transform may then be applied to obtain a reconstructed shot record. The reconstructed shot record may then be set equal to the input shot record at locations where the input traces were not identically zero. These steps are repeated, with more Fourier coefficients kept after each iteration, stopping when the output traces are no longer improving (i.e., at convergence). The technique is not limited to Fourier transforms, as other transforms may be used. Further, more complicated algorithms, or projection operators, may be used to limit, or shrink, the coefficients in the transform domain, e.g., the frequency domain. Generally, a projection operator is a mathematical operator that is applied to a data set, which if given a convex set A and a point z, finds a point x in A that is closest to z. A projection operator may be implemented using a "soft thresholding" operator as described with respect to sparsity, above. As used herein, a projection operator may also include a hard threshold.

An example of a projection operator in the f–k or curvelet domains is given by soft thresholding, which reduces the magnitude of each coefficient by a certain amount (threshold) as long as the result is a positive number and set to zero otherwise (see for example Simard P. Y and Mailloux, G. E. (1990), "Vector Field Restoration by the Method of Convex Projections", *Computer Vision, Graphics, and Image Processing*, 52, No. 3, pp. 360-385 for a derivation of projection operators in various cases). Similar projection operators have been developed for non-geophysical applications such as digital image processing and medical imaging processing. See for example U.S. Pat. No. 6,307,569, U.S. Pat. No. 7,202,663, and International Patent Application WO2007/095312A2.

Conceptually, FIG. 1 illustrates an overview of the POCS-type technique for using a transform to iteratively interpolate missing geophysical data (e.g., seismic data). As shown in this figure, the collected geophysical data of a first type (e.g., seismic data) may be used to obtain an approximation of the structure of geological layers in the subsurface region by interpolating across any missing geophysical data. The approximation exists in an input data domain 102, which encompasses both the geophysical data as collected or obtained data 104 (including any missing or estimated traces) and a best approximation to the physical reality, such as the interpolated data 106. The geophysical data 104 may be transformed to a transform domain 108, as indicated by line 110. For example, a Fourier transform may be used to convert the input data from the space time domain to the f–k domain. In the transform domain 108, a projection operator, a shrinkage function, or other adjusting function, may be imposed on the transformed data 112 to reduce or eliminate certain coefficients, such as coefficients that are less than a certain magnitude. After the shrinkage function has been applied to the transformed data 112, an inverse transform may be applied to convert the transformed data 112 back to the input data domain 102, as indicated by line 114. The newly approximated data 116 may be closer to the interpolated data 106. In the input data domain 102, the newly approximated data 116 may then be set to the value of the collected data 104 at all points for which a data value is known, e.g., all points for which data values are not missing. Over the course of several cycles the approximation approaches the interpolated data 106, resulting in an approximation that includes interpolated values for missing data points. However, the performance of the POCS-type interpolation degrades as shot and receiver sampling become coarser and aliasing becomes more severe.

In a second scheme, the physical properties of the geological layers are generally known and used to interpolate geophysical data, such as seismic data. Conceptually, if the subsurface properties (e.g., seismic wave velocities and densities) are known, one should be able to reconstruct geophysical data at arbitrary locations by modeling the field. However, this may not be easily achieved because subsurface properties are typically not known with sufficient accuracy. A more practical approach may be to redatum the geophysical data using an approximate velocity field and then redatum the image to emulate acquisition at the desired location, such as the surface of the ocean. Alternatively, one can map geophysical data, such as seismic data, to zero offset using Dip-Move-Out (DMO) processing and then reconstruct the desired source-receiver geometry by performing inverse DMO. The drawback of this method is that accuracy of geophysical data (e.g., seismic data) reconstruction and interpolation may depend on the accuracy of the physical properties and transformations used in the calculations. In practice, however, properties such as velocity may not be accurately known. Moreover, subsurface properties may be known only up to a certain depth. For example, for marine acquisition, the properties of water are usually well known, while subsurface properties below the seafloor are usually only approximately known.

The geophysical approaches of the second scheme do not make use of statistical properties of the geophysical data, such as sparsity for seismic data, for example. Further, modeling a subsurface region in a field may be computationally expensive in three dimensions (3D) and, thus, may be only feasible in two dimensions (2D). Finally, none of these techniques provide methods for combining different types of geophysical data which may have been acquired in the field to overcome incomplete sampling.

Figure 2:
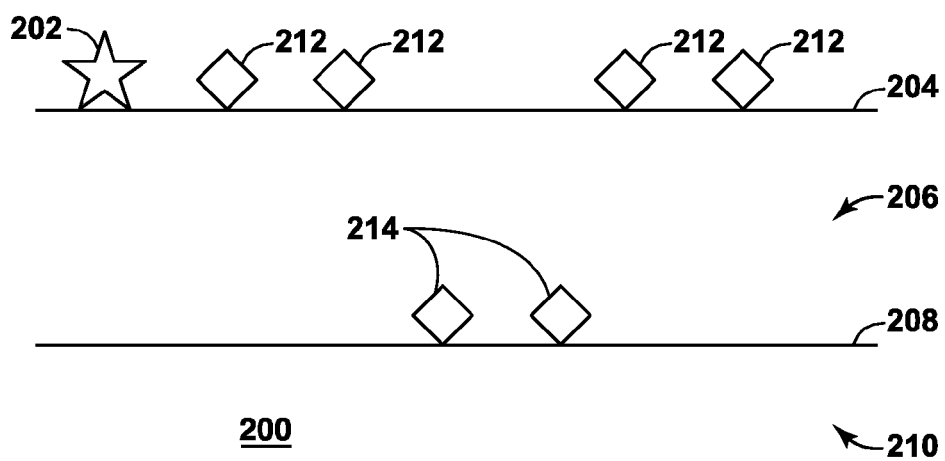
FIG. 2 is an illustration of a scheme for collecting different types of geophysical data (e.g., seismic data, controlled source electromagnetic data) that may be useful in an exemplary embodiment of the present invention.

FIG. 2 is an illustration of a scheme 200 for collecting different types of geophysical data (e.g., ocean surface seismic data, ocean bottom seismic data, land based seismic data, or any combinations thereof). This example uses seismic data for simplicity. However, seismic data is one type of geophysical data that may be useful in an exemplary embodiment of the present invention. In this illustration, a source 202, such as an airgun, a plasma sound source, a dynamite charge, or a boomer, among others, may generate a compression wave at the surface 204 of the ocean. The compression wave may be transmitted through the water column 206 and then through the ocean floor 208 into the geologic layers 210 below the ocean floor 208. At each point that the elastic wave encounters a change in impedance in the geological layers 210 of the subsurface region, such as a change in types of rocks, a reflection is created. The reflections may be transmitted up through the geological layers 210, and through the water column 206, where the amplitude of the reflections may be detected by receivers 212 located on the surface 204 of the ocean, such as seismic streamers towed by a seismic ship. This seismic data may be termed free surface (FS) data. Alternatively, the amplitude of the reflections may be detected by receivers 214 located on the ocean floor 208, such as an ocean bottom system. This seismic data may be termed water bottom (WB) data. Although collecting both types of seismic data provides more information about the geological layers 210 below the ocean floor 208, combining the two types of seismic data for the purposes of interpolation may be difficult due to differences in data type, e.g., receiver location.

The different types of seismic data may be mathematically related to each other. For example, seismic data generally satisfy the linearized conservation of momentum equation (also known as elastic wave equation with attenuation), which may be given as shown in equations (1) and (2).

$$\rho(x)\partial_t^2 u(x, t) - \nabla \cdot T(x, t) = g(x, t) \quad (1)$$

$$T(x, t) = \int_{-\infty}^{\infty} c(x, t-\tau) : \nabla u(x, \tau) d\tau \equiv \int_{-\infty}^{\infty} c_{ijkl}(x, t-\tau) \partial_k u_l(x) d\tau \quad (2)$$

In equations (1) and (2), $$c(x, t)|_{t<0} = 0 \text{ and } c_{ijkl} = c_{klij} = c_{jikl}.$$

Further, T is the stress tensor; $c_{ijkl}$ is a fourth-order tensor containing elastic constants or matrix components that define the elastic properties of the material in the anisotropic and inhomogeneous medium; each of the indices i, j, k, l can take the values of 1, 2, or 3, corresponding to the three coordinate directions $x_1$, $x_2$, $x_3$; $\rho$ is density; $\mu_l$ are the components of the particle displacement vector; g is the body force density (seismic sources); $x=(x_1,x_2,x_3)$; t is time;

$$\partial_k \equiv \frac{\partial}{\partial x_k};$$

and $\nabla=(\partial_1,\partial_2,\partial_3)$.

Simplified versions of equation (2) may be used for redatuming seismic data, which shifts the apparent collection point to a new location, for example, making FS data appear to have been collected as WB data. Redatuming may be performed by applying a one-way wave equation to the data in a frequency domain, then converting the data back to the time domain. The term "wave equation" may describe the linear conservation of momentum equation, Maxwell's equations, or Navier-Stokes equations, among others.

Previous methods for seismic data interpolation have been unable to develop a mathematically consistent framework that can simultaneously exploit the information contained in different types of seismic data in tandem with known statistical and physical properties of geophysical data in order to reconstruct seismic data of a desired type. Exemplary embodiments of the present invention overcome these deficiencies by incorporating both statistical and physical assumptions into an enhanced POCS-type method.

Generally, the enhanced POCS-type method may be performed by obtaining an initial estimate of the reconstructed seismic data and adjusting the initial estimate so that it satisfies known statistical properties of the reconstructed seismic data. A wave-equation-based transformation is then used to convert the seismic data of the adjusted estimate to a virtual collection point matching another data type. The converted seismic data is adjusted so that it matches collected data for the new data type. This may be repeated for each data type for which seismic data were measured or other data types such as CSEM. Finally, the seismic data may be converted back to the initial data type and the process repeated until convergence (or a selected tolerance of fit) is achieved. Seismic and CSEM data may be used together in the present inventive method as a first and second data type. In such an application, an appropriate rock-physics model may be used to relate the CSEM and seismic data. See, for example, Kwon and Sneider, "Uncertainty Analysis for the Integration of Seismic and CSEM Data," *SEG Expanded Abstracts* (2009).

Figure 3:
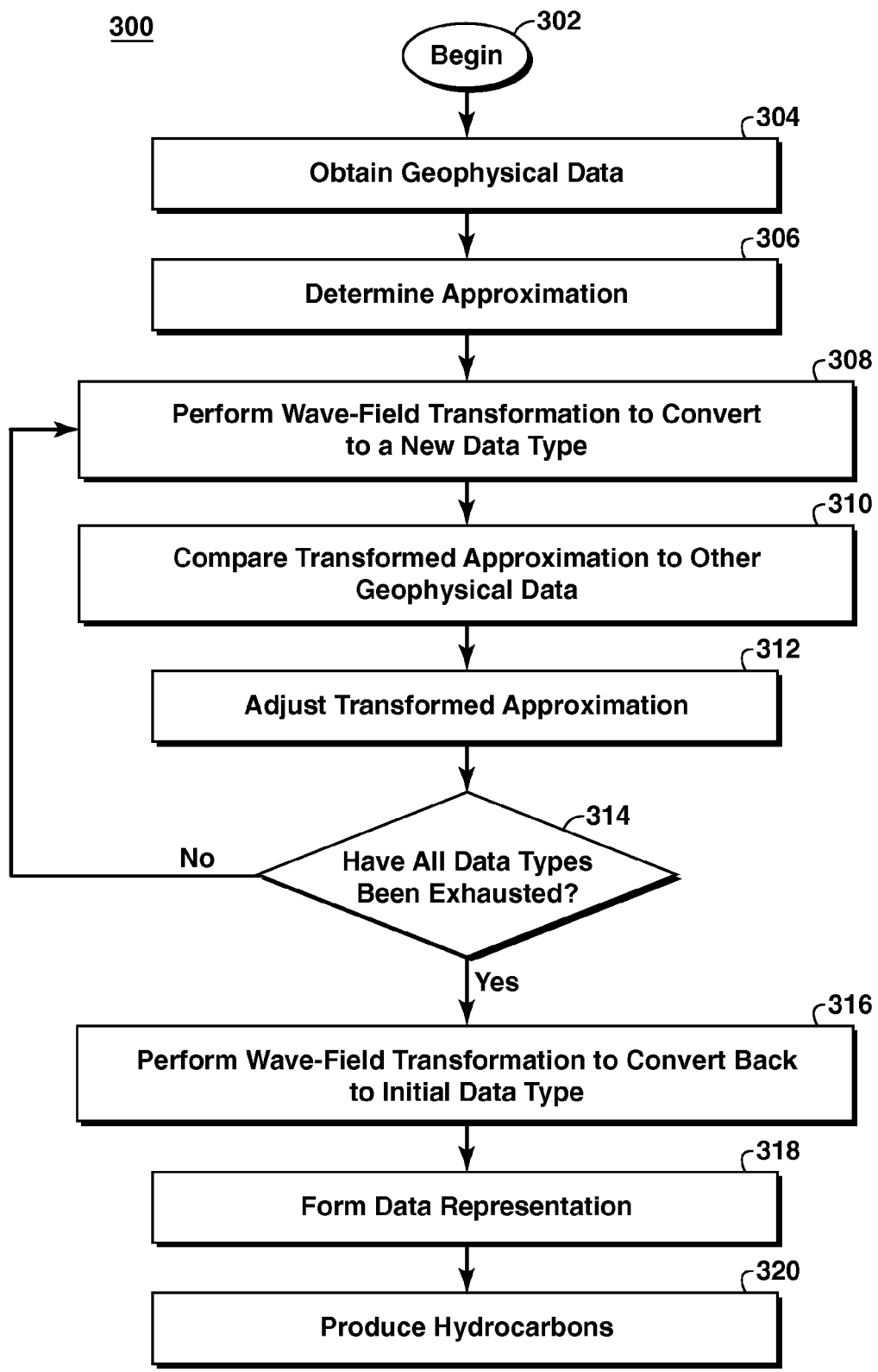
FIG. 3 is a process flow diagram showing a method for using auxiliary geophysical data to enhance the data analysis, in accordance with an exemplary embodiment of the present invention.

FIG. 3 is a process flow diagram 300 showing a method for using auxiliary geophysical data to enhance the data analysis of a subsurface region, in accordance with an exemplary embodiment of the present invention. The process begins at block 302. At block 304, geophysical data (e.g., seismic data) may be obtained. The obtained geophysical data may have missing data values or may be a limited data set. Then, the obtained geophysical data is approximated to form an approximation, as shown in block 306. The approximation may insert values for missing data to zero or may insert calculated data to replace the missing data. Regardless, the approximation (e.g., approximated seismic data) may be transformed by a wave-field transformation from an input data domain (e.g., native domain) into a transformed approximation in an auxiliary domain, as shown in block 308. This wave-field transformation may be performed by redatuming, as discussed above. The auxiliary domain may include another type of geophysical data, as defined previously. Once the transformed approximation is converted into the auxiliary domain, the transformed approximation is compared to other geophysical data in block 310. The comparison may involve determining a correspondence between missing data and data collected in the auxiliary domain. Then, the regions in the transformed approximation that have missing data may be set to substantially match the data collected in the auxiliary region based on the comparison, as shown in block 312.

At block 314, a determination is made if any other geophysical data of other types are available to be compared with the adjusted approximation. If other geophysical data of another type is available, then the adjusted approximation is transformed at block 308 into another auxiliary domain associated with an additional geophysical data type. If the other geophysical data of another data type is not available or not desired, then the adjusted approximation may be transformed back into the input data domain, as shown in block 316. Regardless, the adjusted approximation in the auxiliary domain or input data domain is utilized to form a data representation in block 318, such as an image of the subsurface region. The data representation or image may be used to indicate the possible presence of hydrocarbon reservoirs in the subsurface region, which may then be used to assist in the production of hydrocarbons, as shown in block 320. The production of hydrocarbons may include drilling a well down to the predicted location of the reservoir or directing a drilling string from a remote drilling platform to the hydrocarbon reservoir.

As may be appreciated, statistical constraints may be used on the obtained geophysical data during any of the steps above. The statistical constraints may be used to force the obtained geophysical data to be within specified tolerance at those locations where more than one type of data is available. This function is optional, as the transformation to the alternate geophysical data of different types may provide sufficient interpolation. An example of these is provided in FIG. 4 below.

Figure 4:
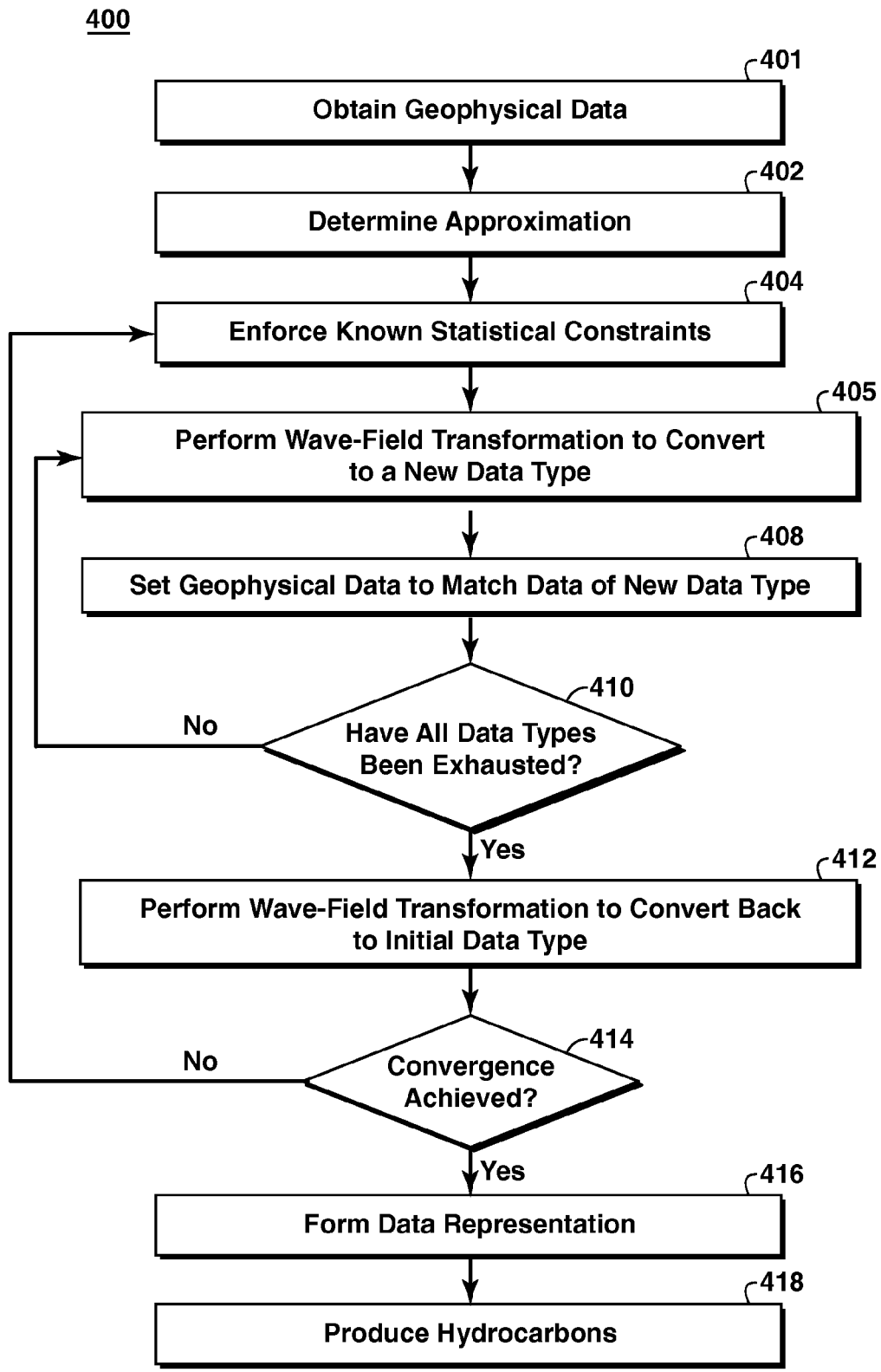
FIG. 4 is another process flow diagram showing a method for using auxiliary geophysical data along with a transform domain to enhance the data analysis, in accordance with an exemplary embodiment of the present invention.

FIG. 4 is an alternative process flow diagram showing a method 400 for using auxiliary data sets to enhance the data analysis, in accordance with an exemplary embodiment of the present invention. The method 400 begins in block 401 by obtaining geophysical data (e.g., seismic data). At block 402, an approximation is determined from the desired geophysical data. This may be performed by processing the geophysical data into a desired format, such as shot gathers, receiver gathers, Common Depth Point (CDP) gathers, common offset gathers, offset stacks, angle gathers, angle stacks, or any other desired data format or grouping. Any missing geophysical data may be left at zero, or may be initially estimated by other techniques, such as a straight linear interpolation from the known geophysical data. Alternatively, physical models may be used to predict an initial approximation from the known geophysical data.

In block 404, statistical constraints on the approximated geophysical data (i.e., approximation) may be enforced to make sure it agrees with the measured geophysical data (e.g., seismic data) to within specified tolerance at those locations where the both are available. This function is optional, as the transformation to the alternate types of geophysical data may provide sufficient interpolation. The enforcement of statistical constraints is performed by transforming the reconstructed geophysical data to a suitable transform domain. As discussed herein, transform domains that may be used in the case of seismic data are the Fourier (f–k) domain, the Radon (tau–p) or the curvelet domain, among others. If sparsity constraints are to be used for shrinkage, a desired degree of sparsity may be determined by examining those parts of the seismic data that do not require interpolation and are expected to be substantially similar to the seismic data being reconstructed. The level of sparsity may be quantified by prescribing the L-1 norm (or another suitable norm) in the transform (f–k, tau–p, curvelet) domain, defining a convex set. Projection onto the convex set may be performed using a soft thresholding operator, although other operator choices are also possible, with a threshold chosen in such a way that the L-1 norm of the resulting transform does not exceed the desired magnitude. The magnitude of the L-1 norm may change, for example, increasing, from iteration to iteration. Once this is achieved, an inverse transform may be performed to convert the data to the original domain and thus obtain an approximation to the reconstructed seismic data.

In block 406, the approximation (e.g., reconstructed geophysical data) from block 404 may be converted (such as by wave-field extrapolation, DMO, or other techniques) to a suitable data type so that it becomes comparable to geophysical data of a chosen measured data type. The extrapolation can be performed by redatuming using an anisotropic one-wave wave-equation extrapolation operator, a Kirchhoff operator, or another operator chosen based on the level of complexity suitable for given seismic data. For example, if the auxiliary data is another seismic data type that was acquired at the sea floor, the extrapolation involves redatuming in a constant-velocity medium (water). This is discussed further with respect to the example below. If the measured seismic data were acquired in a well-bore, then a more detailed knowledge of velocities in the vicinity of the well may be required. In any case, a suitable physics-based algorithm, as discussed above, may be used to convert the current estimate of the reconstructed seismic data into a form suitable for comparison with the measured seismic data.

In block 408, the redatumed geophysical data is set to substantially match the measured geophysical data of the new data type at each matching location. Before or after this, statistical constraints on the approximation (e.g., reconstructed geophysical data) may be enforced to make sure it agrees with the measured geophysical data to within specified tolerance at those locations where both are available, although this is optional. As discussed with respect to block 404 above, this may be performed by converting the geophysical data, such as seismic data, into a suitable transform domain. A shrinkage function, or other function, may then be imposed on the geophysical data in the transform domain, for example, using a soft thresholding operator. The geophysical data may then be subjected to an inverse transform to return the geophysical data to the input domain. The extrapolated seismic data may then be set to equal the collected seismic data at those locations where it is available. Because the initial type of seismic data and the auxiliary seismic data may have been acquired using different types of receivers, additional processing, such as bandpass filtering or deconvolution by source or receiver impulse response function, may be performed to better relate the different types of seismic data.

In block 410, a determination is made as to whether any additional types of geophysical data remain. If additional data types are present, the method 400 returns to block 406 to continue the iterations. If no additional data types are present, the method 400 proceeds to block 412 in which the resulting geophysical data is converted back into the data type of the approximation (e.g., reconstructed seismic data), completing the first loop. In block 414, a determination is made as to whether convergence has been achieved. If not, the method 400 may return to block 404 to repeat the blocks. If so, in block 416 the method 400 forms a data representation of the geological layers in the subsurface region. The data representation may include an image of the geological layers of the subsurface regions, a two dimensional matrix of properties of the geological layers or geological regions, or a three dimensional matrix of properties of the geological layers or subsurface region, or any combinations thereof. The data representation may be used to predict a subsurface location for hydrocarbons. In block 418, the predicted subsurface location may be used to assist in the production of the hydrocarbons, such as by providing directions for guiding a drill string.

Figure 5:
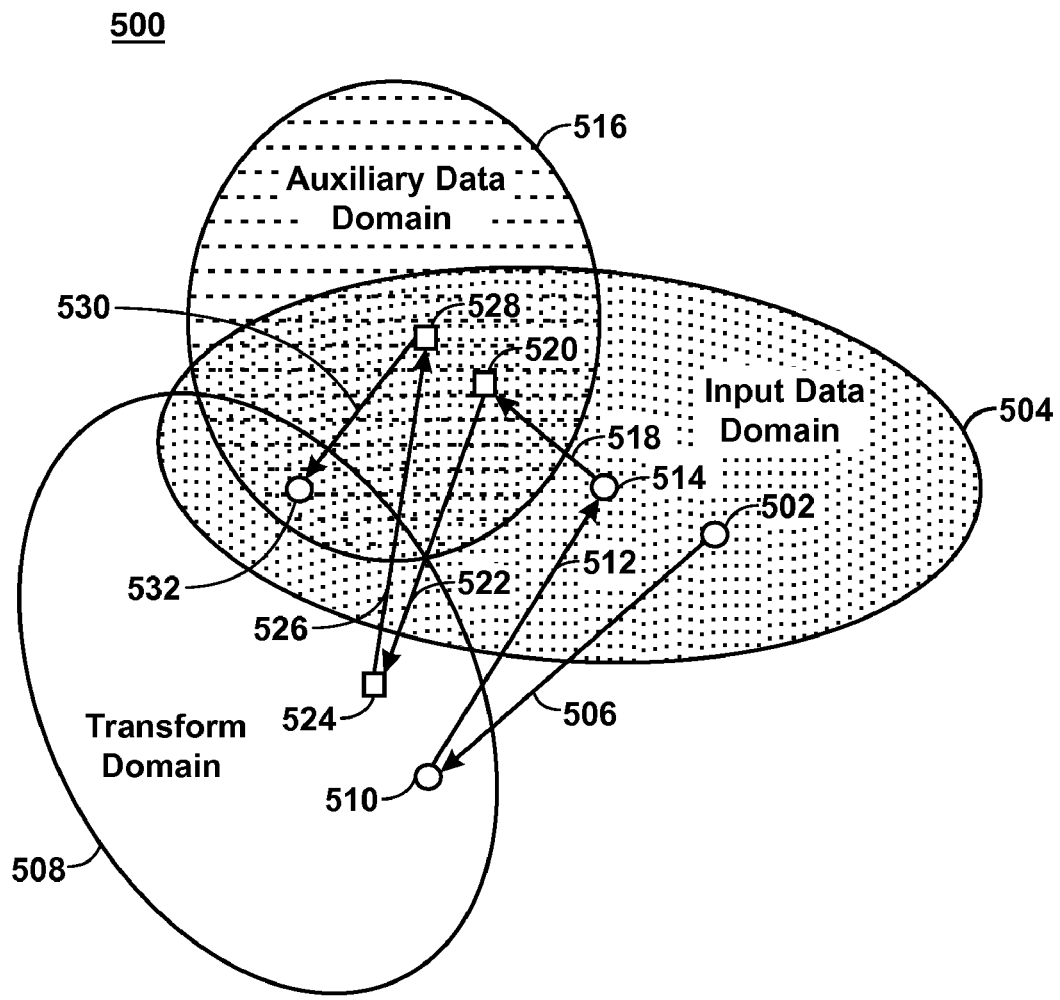
FIG. 5 is an overview of a technique for using auxiliary geophysical data in an iterative process to enhance data analysis, in accordance with an exemplary embodiment of the present invention.

FIG. 5 is an overview of an enhanced POCS-type method 500 in accordance with an exemplary embodiment of the present invention. The particular steps involved are discussed in further detail with respect to the process flow diagram shown in FIG. 5. In this overview 500, geophysical data of different types has been obtained, such as FS data and WB seismic data, for example. An initial estimate 502 of the geological data in the input data domain 504 is calculated from the obtained geophysical data. The initial estimate 502 may be missing values for geophysical data and/or may be on an irregular grid, depending on the geophysical survey technique. The initial estimate or approximation 502 may be transformed, as indicated by line 506 into a transform domain 508. In the transform domain 508, the transformed approximation 510 may be subjected to a sparsity constraint, such as the projection operators described herein, or may be subjected to a shrinkage function on the basis of the known physical properties of a field. The transformed approximation 510 may then be subjected to an inverse transform, as indicated by line 512, back to the input data domain 504. After the transformation, the approximation 514 may be set equal to the input data for points that are known. This cycle may be performed once or may be performed multiple times until convergence is achieved. Further, it may not be necessary to enforce statistical constraints on the initial approximation 502.

The approximation 514 may then be redatumed or otherwise transformed into an auxiliary data domain 516, as indicated by line 518. The auxiliary data domain 516 includes approximations to another type of geophysical data, such as ocean bottom (WB) data. In the auxiliary data domain 516 the auxiliary approximation 520 may be set to substantially equal to the measured geophysical data of the new type (within a user selected tolerance, for example, about +/−1%, +/−5%, +/−10%, etc.) at locations for which data is present.

Optionally, statistical constraints may be imposed on the auxiliary approximation 520. To perform this function, the auxiliary approximation 520 may be transformed from the auxiliary data domain 516 to a transform domain 508, as indicated by line 522. This may be the same transform as used for the initial estimate 502 or a different transform may be used. The transformed auxiliary approximation 524 may be subjected to a sparsity or physical constraint, prior to being subjected to an inverse transform which converts the data back to the auxiliary data domain 516, as represented by line 526. The interpolation process may be performed once or may be repeated until the data converges. The final auxiliary approximation 528 may be redatumed back to the input domain 504, as indicated by line 530 resulting in a optimal approximation 532.

If the data has not converged or does not sufficiently match the input data, the process may be repeated until convergence occurs. Further, more geophysical data sets of different data types may be used, if available, to improve the accuracy of the approximation.

Embodiments of the present techniques may be used for data reconstruction in the case of the over-under streamer acquisition, dual-sensor streamer acquisition, multi-azimuth surveys, and vertical seismic profiling. Generally, one type of geophysical data (e.g., seismic data) may be designated as the primary data to be interpolated to obtain the desired reconstructed geophysical data and the other types of data as auxiliary geophysical data to be used as constraints in interpolating the primary data. However, embodiments include reconstructing the geophysical data in a type that differs from that of all available measured geophysical data.

Figure 6:
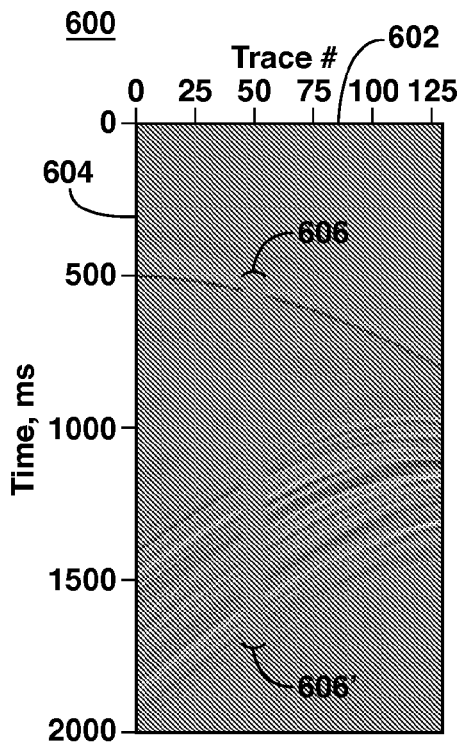
FIG. 6 is a synthetic seismic data set illustrating a missing block of seismic data.
Figure 7:
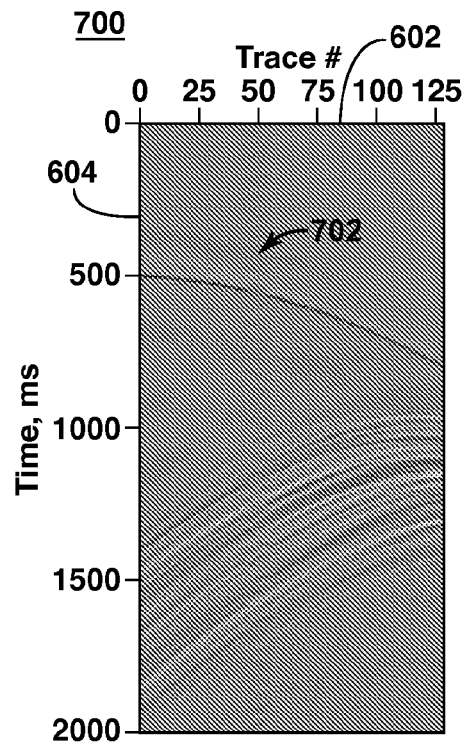
FIG. 7 is a synthetic seismic data set illustrating the results of using the general POCS-type technique of FIG. 1 to extrapolate the missing seismic data of FIG. 6.

FIG. 6 is a chart of synthetic FS data (shot records) illustrating a missing block of seismic data, which is one example of geophysical data. The x-axis 602 represents the trace number of the seismic data, which may generally correspond to a linear distance between the source and a receiver. The y-axis 604 represents time of travel for the reflection to propagate down from the source to the layer and then back up to the receiver, which may represent the depth of the geological layer, depending on the properties of the geological layers. A series of traces, as indicated by reference numerals 606 and 606', were set to zero to represent missing seismic data. As discussed previously, this may occur in the case of marine data acquisition around existing platforms, wherein ocean surface (FS) data may not have been recorded by conventional streamer methods due to presence of the obstructions. FIG. 7 is a synthetic seismic data set illustrating the results of using the general POCS-type technique of FIG. 1 to extrapolate the missing seismic data of FIG. 6. As can be seen in FIG. 7, the extrapolation quality is poor in the region of the missing seismic data, as indicated by reference numeral 702.

However, in these situations, limited ocean bottom (WB) data may be acquired. In this example, the WB data was simulated and is not shown. Accordingly, the method described with respect to the exemplary embodiment of FIG. 4 was used to interpolate to both types of the seismic data. Initially, the simulated FS data was transformed into the f–k domain using a Fourier transform. Soft thresholding was applied to the Fourier coefficients in order to make the L1 norm of the Fourier coefficients for the FS data match an a-priori estimate, obtained by examining parts of the FS data that are adequately sampled. Inverse Fourier transform was then applied to obtain reconstructed FS data. The reconstructed FS data was then set equal to the simulated FS data at all locations where the input traces were known.

The resulting FS data were then extrapolated to the seafloor using wave equation redatuming, as discussed with respect to equation (2). The redatuming was performed by transforming the FS data from the time-space domain (t,x,y) to the frequency-wavenumber domain ($\omega,k_x,k_y$), using a Fourier transform. The transformed FS data were then migrated from the ocean surface receiver location to the ocean bottom receiver location with water velocity "c" using equation (3) in the f–k domain.

$$p(\omega, k_x, k_y, z)|_{z=z_{WB}} = p(\omega, k_x, k_y, z)|_{z=z_{FS}} \qquad (3)$$

$$\exp\left\{i(z_{WB} - z_{FS})\frac{\omega}{c}\sqrt{1 - (k_x^2 + k_y^2)\left(\frac{c}{\omega}\right)^2}\right\}$$

In equation (3), p represents the value of the seismic data in the frequency domain, $\omega$, $k_x$, and $k_y$ represent the transformed coordinates, z represents the vertical coordinate (which was not transformed), $Z_{WB}$ represents the vertical coordinate of the ocean bottom receivers, and $Z_{FS}$ represents the vertical location of the ocean surface receivers. The extrapolated seismic data were then transformed from the frequency-wavenumber domain ($\omega,k_x,k_y$) back to the to time-space domain (t,x,y) to obtain virtual ocean bottom (WB) data. The reconstructed WB data were then subtracted from the simulated WB data at all locations where the input traces were known (i.e., not identically zero) to form a data residual.

The data residual was then redatumed back to the free surface by converting it to the f–k domain using a Fourier transform, then imposing a version of equation (3). The redatumed data residual was then transformed from the frequency-wavenumber domain ($\omega,k_x,k_y$) back to the to time-space domain (t,x,y) and added to the FS data to form an updated approximation. The steps above were repeated until convergence was achieved.

Figure 8:
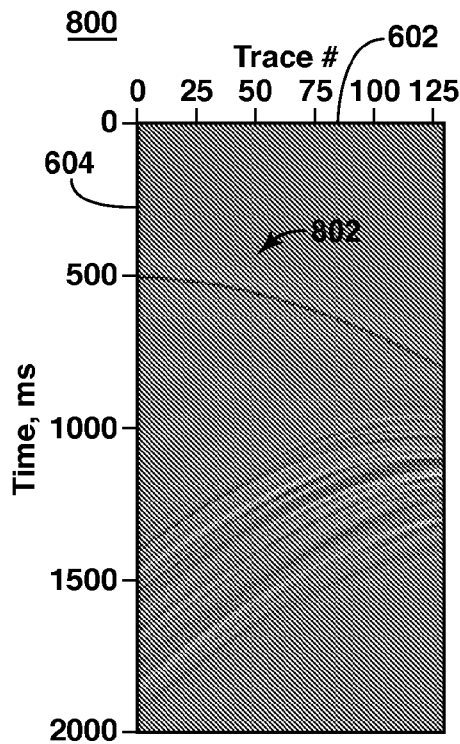
FIG. 8 is a synthetic seismic data set illustrating the results of using the method of FIGS. 3-4 to extrapolate the missing seismic data of FIG. 6, in accordance with exemplary embodiments of the present invention.

Interpolation using the proposed methodology, which incorporates both sparsity-based constraints and the seismic data acquired at the sea floor produces a much better result as shown in FIG. 8. FIG. 8 is a synthetic seismic data set illustrating the results of using the method of FIGS. 3-5 to extrapolate the missing seismic data of FIG. 6, in accordance with exemplary embodiments of the present invention. As indicated by reference numeral 802, a higher quality interpolation of the missing seismic data was obtained using exemplary embodiments than obtained using the POCS-type technique, which gave the results shown in FIG. 7.

Figure 9:
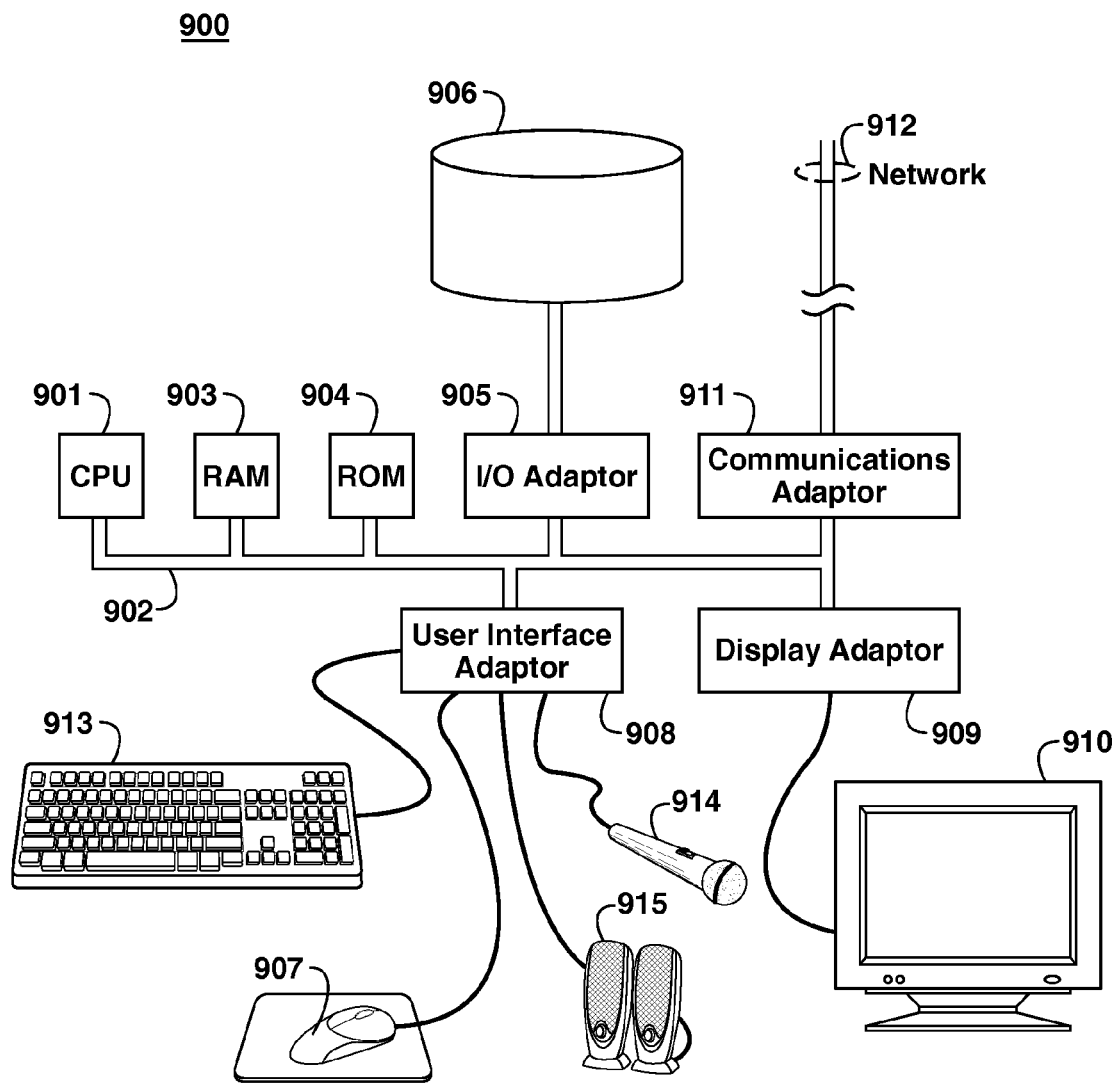
FIG. 9 is a block diagram illustrating a computer system that may be used to implement exemplary embodiments of the present invention.

The techniques discussed herein may be implemented on a computing device, such as that illustrated in FIG. 9. FIG. 9 illustrates an exemplary computer system 900 on which software for performing processing operations of embodiments of the present invention may be implemented. A central processing unit (CPU) 901 is coupled to a system bus 902. In embodiments, the CPU 901 may be any general-purpose CPU. The present invention is not restricted by the architecture of CPU 901 (or other components of exemplary system 900) as long as the CPU 901 (and other components of system 900) supports the inventive operations as described herein. The CPU 901 may execute the various logical instructions according to embodiments. For example, the CPU 901 may execute machine-level instructions for performing processing according to the exemplary operational flow described above in conjunction with FIGS. 1-7. As a specific example, the CPU 901 may execute machine-level instructions for performing operational block 406 of FIG. 4.

The computer system 900 also preferably includes random access memory (RAM) 903, which may be SRAM, DRAM, SDRAM, or the like. The computer system 900 preferably includes read-only memory (ROM) 904 which may be PROM, EPROM, EEPROM, or the like. The RAM 903 and the ROM 904 hold user and system data and programs, as is well known in the art.

The computer system 900 also preferably includes an input/output (I/O) adapter 905, a communications adapter 911, a user interface adapter 908, and a display adapter 909. The I/O adapter 905, user interface adapter 908, and/or communications adapter 911 may, in certain embodiments, enable a user to interact with computer system 900 in order to input information.

The I/O adapter 905 preferably connects to storage device(s) 906, such as one or more of hard drive, compact disc (CD) drive, floppy disk drive, tape drive, flash drives, USB connected storage, etc. to computer system 900. The storage devices may be utilized when RAM 903 is insufficient for the memory requirements associated with storing data for operations of embodiments of the present invention. The data storage of computer system 900 may be used for storing such information as angle stacks, AVA parameters, intermediate results, and combined data sets, and/or other data used or generated in accordance with embodiments of the present invention. The communications adapter 911 is preferably adapted to couple the computer system 900 to a network 912, which may enable information to be input to and/or output from the system 900 via the network 912, e.g., the Internet or other wide-area network, a local-area network, a public or private switched telephony network, a wireless network, or any combination of the foregoing. The user interface adapter 908 couples user input devices, such as a keyboard 913, a pointing device 907, and a microphone 914 and/or output devices, such as speaker(s) 915 to computer system 900. The display adapter 909 is driven by the CPU 901 to control the display on the display device 910, for example, to display information pertaining to a target area under analysis, such as displaying a generated 3D representation of the target area, according to certain embodiments.

It shall be appreciated that the present invention is not limited to the architecture of the computer system 900 illustrated in FIG. 9. For example, any suitable processor-based device may be utilized for implementing all or a portion of embodiments of the present invention, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

While the present invention may be susceptible to various modifications and alternative forms, the exemplary embodiments discussed above have been shown only by way of example. However, it should again be understood that the invention is not intended to be limited to the particular embodiments disclosed herein. Indeed, the present invention includes all alternatives, modifications, and equivalents falling within the true spirit and scope of the appended claims.

The invention claimed is:

1. A method for enhancing geophysical data, the method comprising:
   obtaining geophysical data of two or more types for a subsurface region, the two or more types including at least a first type of geophysical data and a second type of geophysical data;
   determining an approximation to the obtained geophysical data of the first type;
   performing, using a computer, a wave-field transformation on the approximation to form a transformed approximation, wherein the transformed approximation corresponds to the obtained geophysical data of the second type;
   either adjusting the transformed approximation to substantially match the obtained geophysical data of the second type at corresponding locations, or computing a mismatch between the transformed approximation and the obtained geophysical data of the second type at corresponding locations; and
   using the adjusted approximation or the mismatch to enhance a geophysical data representation of the subsurface region.

2. The method recited in claim 1, further comprising enforcing statistical constraints on the approximation either prior to or after performing the wave-field transformation on the approximation.

3. The method recited in claim 1, wherein determining the approximation comprises processing the geophysical data to estimate initial values for missing geophysical data.

4. The method of claim 2, wherein enforcing statistical constraints on the approximation comprises:
   transforming the approximation into a transform domain from a native domain;
   adjusting the approximation in the transform domain to satisfy known statistical properties; and
   performing an inverse transformation to convert the adjusted approximation back to the native domain from the transform domain.

5. The method of claim 4, wherein transforming into the transform domain comprises applying a Fourier transform, a curvelet transform, a Radon transform, or any combinations thereof.

6. The method of claim 1, wherein adjusting the transformed approximation comprises the application of a projection operator to the transformed approximation.

7. The method of claim 6, wherein the projection operator comprises a hard threshold function or a soft threshold function.

8. The method of claim 1, wherein performing a wave-field transformation on the approximation comprises:
   transforming the approximation into a transform domain;
   imposing a function on the approximation in the transform domain; and
   performing an inverse transformation on the approximation to form the transformed approximation.

9. The method of claim 8, wherein transforming comprises applying a Fourier transform function, a curvelet transform, or a Radon transform.

10. The method of claim 8, wherein the function is a one-way wave equation-based extrapolator.

11. The method of claim 1, wherein the types of geophysical data obtained comprise ocean surface seismic data, ocean bottom seismic data, land based seismic data, CSEM, or any combinations thereof.

12. The method of claim 1, wherein the data representation is an image of the geological layers in the subsurface region, a two dimensional matrix of properties of the geological layers in the subsurface region, or a three dimensional matrix of properties of the geological layers in the subsurface region, or any combinations thereof.

13. The method of claim 1, wherein using the adjusted approximation to enhance a geophysical data representation of the subsurface region comprises:
performing a wave-field transformation on the adjusted approximation to form a second transformed approximation, wherein the second transformed approximation corresponds to the obtained geophysical data of the first type;
adjusting the second transformed approximation to substantially match the obtained geophysical data of the first type at corresponding locations; and
using the adjusted second transformed approximation to enhance a geophysical data representation of the subsurface region.

14. The method of claim 3, wherein using the mismatch to enhance a geophysical data representation of the subsurface region comprises:
performing a wave-field transformation on the mismatch to form a transformed mismatch, wherein the transformed mismatch corresponds to the obtained geophysical data of the first type;
using the transformed mismatch to adjust the approximation to the obtained geophysical data of the first type at locations of the missing geophysical data, thereby forming an interpolated geophysical data set of the first type; and
using the interpolated geophysical data set of the first type to enhance a geophysical data representation of the subsurface region.

15. A method for producing hydrocarbons from a subsurface region, comprising:
obtaining geophysical data of two or more types representing the subsurface region, the two or more types including at least a first type of geophysical data and a second type of geophysical data;
determining an approximation to the obtained geophysical data of the first type;
performing, using a computer, a wave-field transformation on the approximation to form a transformed approximation, wherein the transformed approximation corresponds to the obtained geophysical data of the second type;
either adjusting the transformed approximation to substantially match the obtained geophysical data of the second type at corresponding locations, or computing a mismatch between the transformed approximation and the obtained geophysical data of the second type at corresponding locations; and
using the adjusted approximation or the mismatch to enhance a geophysical data representation of the subsurface region;
predicting a location in the subsurface region for hydrocarbons based at least in part on the enhanced geophysical data representation; and
extracting hydrocarbons from the subsurface location.

16. A tangible, non-transitory, machine-readable medium containing computer instructions stored therein for causing a computer processor to perform steps comprising:
storing two or more types of geophysical data collected over a subsurface region;
determining an approximation to the collected geophysical data for a first type of the geophysical data;
performing a wave-field transformation on the approximation to form a transformed approximation, wherein the transformed approximation corresponds to the collected geophysical data for a second type of geophysical data;
either adjusting the transformed approximation to substantially match the collected geophysical data of the second type at corresponding locations, or to computing a mismatch between the transformed approximation and the obtained geophysical data of the second type at corresponding locations; and
using the adjusted approximation or the mismatch to enhance a data representation of the subsurface region.

17. The tangible, non-transitory, machine-readable medium of claim 16 comprising computer instructions to enforce statistical assumptions on the approximation.

18. The tangible, non-transitory, machine-readable medium of claim 16, comprising computer instructions to enforce statistical assumptions on the transformed approximation.

19. The tangible, non-transitory, machine-readable medium recited in claim 16, wherein the computer instructions to enhance a data representation of the subsurface region comprise computer instructions to form an image of the subsurface region on a video monitor or other imaging device.

* * * * *